A. S. KROTZ.
TRACTOR.
APPLICATION FILED AUG. 30, 1918.

1,371,312.

Patented Mar. 15, 1921.
4 SHEETS—SHEET 1.

Witnesses:
W. T. Kilroy
Harry R. L. White

Inventor:
Alvaro S. Krotz
Arthur A. Durand
By
Atty.

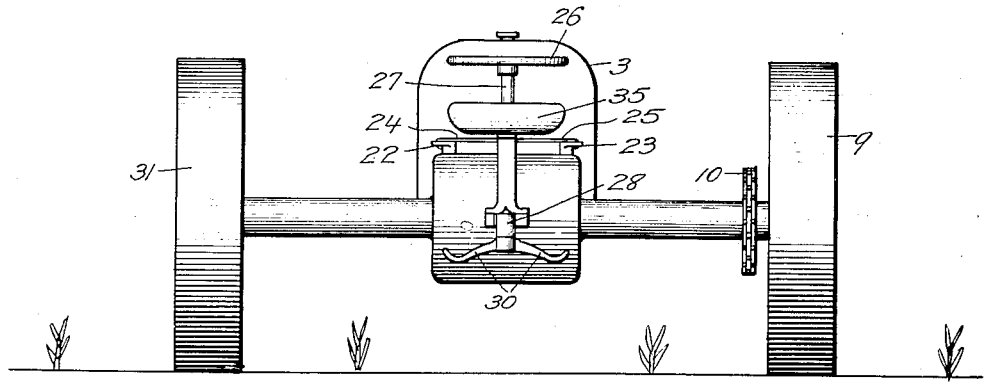
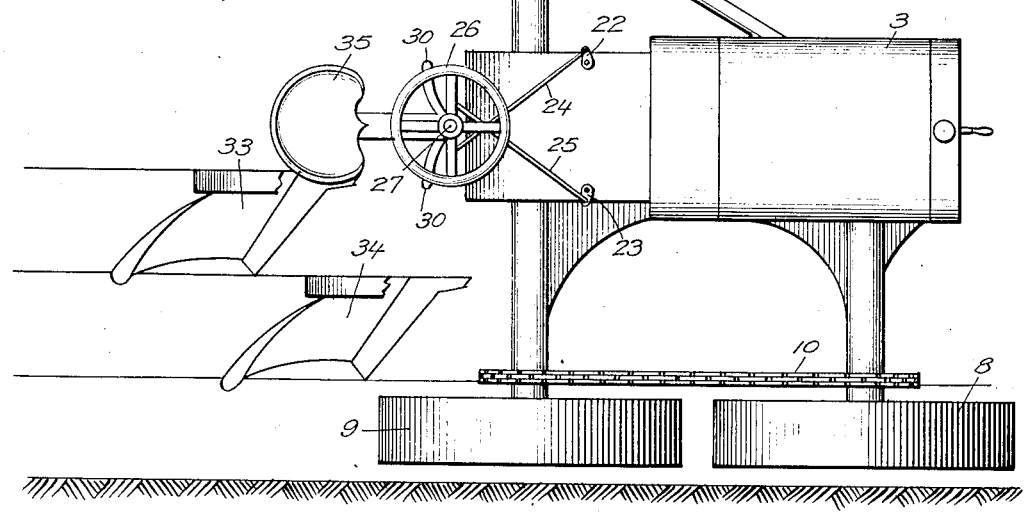

A. S. KROTZ.
TRACTOR.
APPLICATION FILED AUG. 30, 1918.
1,371,312.
Patented Mar. 15, 1921.
4 SHEETS—SHEET 3.
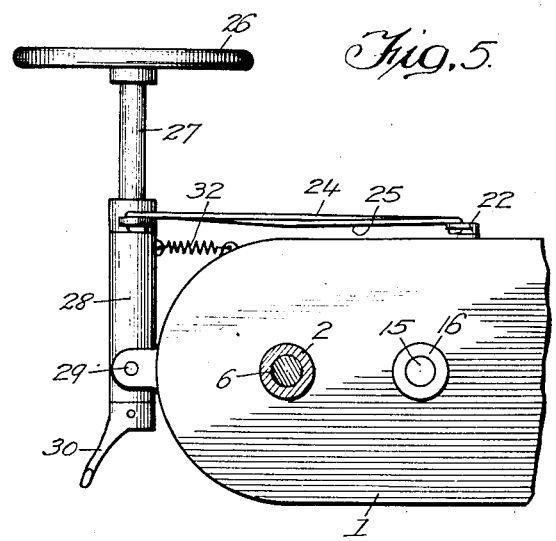
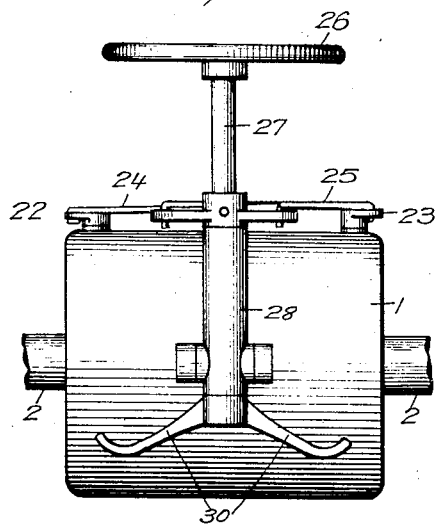
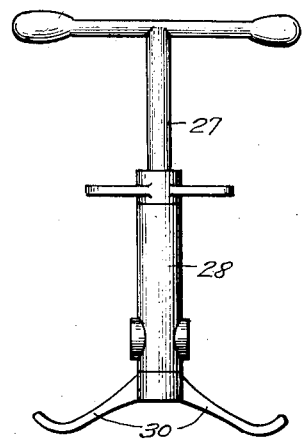

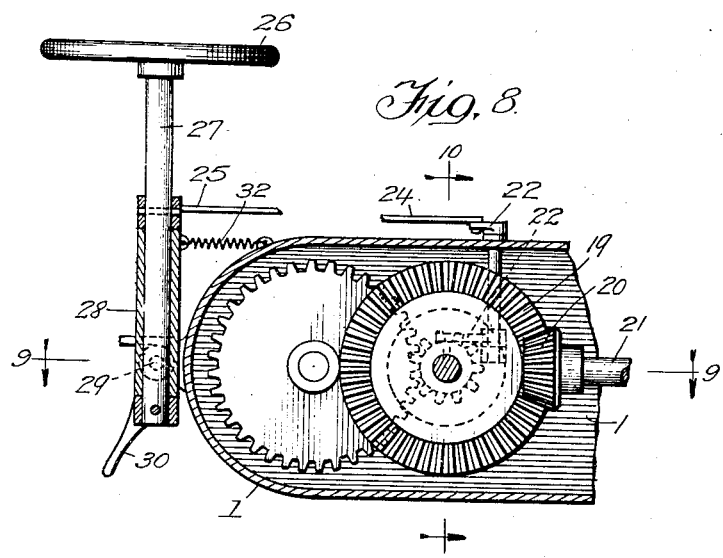
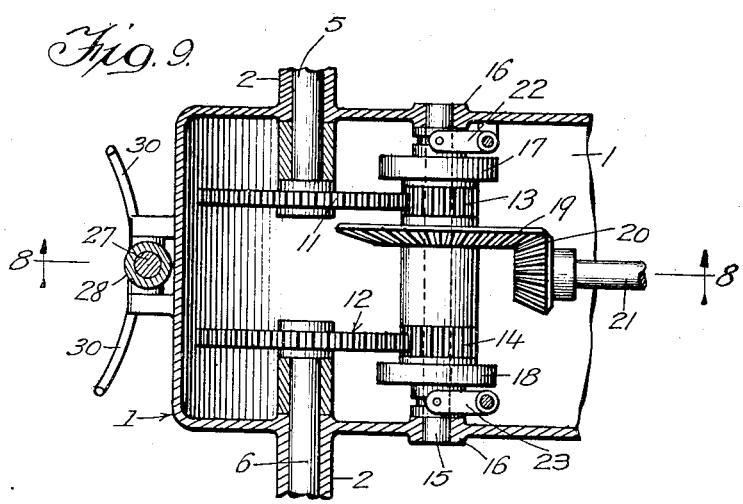
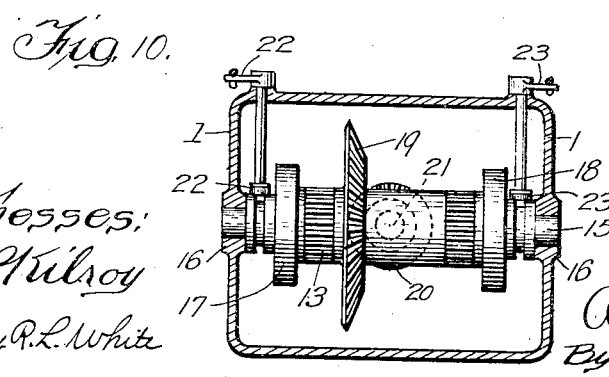

UNITED STATES PATENT OFFICE.

ALVARO S. KROTZ, OF JANESVILLE, WISCONSIN.

TRACTOR.

1,371,312. Specification of Letters Patent. Patented Mar. 15, 1921.

Application filed August 30, 1918. Serial No. 252,065.

*To all whom it may concern:*

Be it known that I, ALVARO S. KROTZ, a citizen of the United States of America, and resident of Janesville, Wisconsin, have invented a certain new and useful Improvement in Tractors, of which the following is a specification.

This invention relates to self-propelled vehicles or tractors in general, but more particularly to those for handling or operating agricultural implements.

Generally stated, the object of the invention is to provide a comparatively short tractor having a rigid frame and to which agricultural implements, such as plows and cultivators, may be directly connected, and which can be handled more conveniently and to better advantage in the field than those heretofore employed for these purposes, and which is of such simple construction that it may be manufactured at a comparatively small cost of production.

It is also an object to provide certain details and features of construction and combinations tending to increase the general efficiency and the desirability of a tractor of this particular character.

To the foregoing and other useful ends the invention consists in matters hereinafter set forth and claimed.

In the accompanying drawings—

Fig. 3 is a rear end elevation of said tractor.

Fig. 4 is a plan of said tractor, and of the gang plow attachment therefor, the view being more or less diagrammatic in character.

Fig. 5 is an enlarged elevation of the steering gear mechanism.

Fig. 6 is a rear elevation of the structure shown in Fig. 5.

Fig. 7 is a rear elevation of certain portions of the steering gear mechanism.

Fig. 8 is a vertical section on line 8—8 in Fig. 9.

Fig. 9 is a section on line 9—9 in Fig. 8.

Fig. 10 is a vertical section on line 10—10 in Fig. 8.

Figure 1:
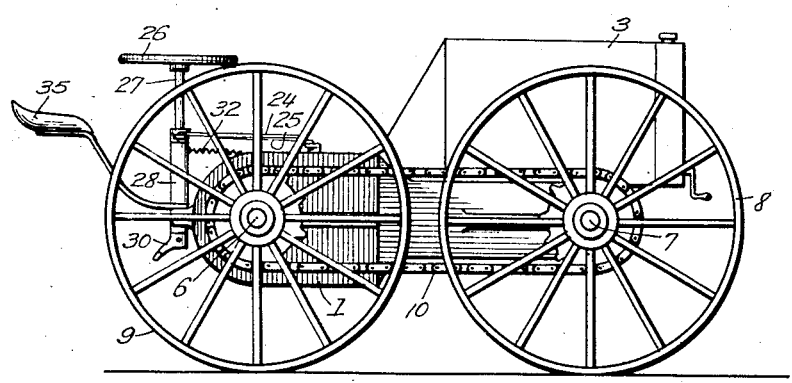
Figure 1 is a side elevation of a tractor embodying the principles of the invention.
Figure 2:
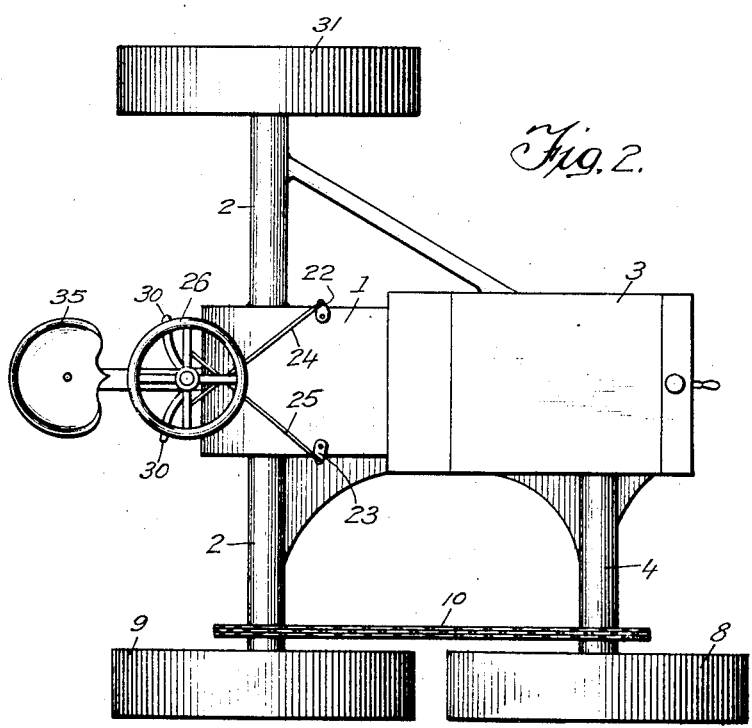
Fig. 2 is a plan of said tractor.

As thus illustrated, the tractor comprises a rigid body frame including a gear box 1 provided with laterally extending sleeve bearings 2, an engine or motor 3, and a forward laterally extending sleeve bearing 4, whereby a rigid three-wheeled vehicle frame is provided. The bearings 2 contain the axles 5 and 6 and the bearing 4 contains an axle 7 for the front wheel 8, which latter travels ahead of and directly in line with the rear wheel 9 which is mounted on the axle 6, these two axles being connected together by a sprocket chain 10 so that they rotate in unison. The axles 5 and 6 are provided respectively with gear wheels 11 and 12 which engage the pinions 13 and 14 that are loosely mounted on the shaft 15, the latter being mounted in bearings 16 on the sides of the gear box. Friction clutches 17 and 18 are provided for connecting the pinions 13 and 14 to the shaft 15, at will, in a manner that will be readily understood. The shaft 15 is rotated by a bevel gear 19 fixed thereon, which engages a bevel pinion 20 on the rear end of the engine shaft 21, which latter extends rearward from the previously mentioned engine. Bell cranks 22 and 23 are provided for operating the clutches 17 and 18, and these bell cranks are suitably connected by crossed rods 24 and 25 with a steering wheel 26 mounted on the upper end of the steering column 27, the latter being suitably supported in the bearing 28 which is pivotally mounted at 29 on the rear end of the gear casing, whereby this column bearing 28 and the steering column are adapted to tilt about a transverse axis. As shown, these rods are connected to the steering column 27, and through the medium of the latter to the steering wheel, so that a rotation of the wheel to the right will exert a pull on the rod 24 and a push on the rod 25, and vice versa, thereby to open one clutch when the other clutch is closed. The lower end of the steering column is provided with a pair of foot pieces 30, whereby the steering mechanism can be operated either by the wheel 26 or by said foot pieces. It will be understood that when the steering wheel is turned one way, one clutch will be operated, so that power will be transmitted from the shaft 15 to either the axle 5 or the axle 6, and so that either the wheel 9 or the wheel 31 at the opposite side will be operated. If the wheel 26 is pulled backward, and thereby tilted about the pivot 29, both clutches 17 and 18 will be operated, so that the axles 5 and 6 will be rotated in unison. A spring 32 serves to normally hold the bearing 28 in upright position, so that normally both clutches are open.

It will be seen that the wheels 8 and 9 are arranged practically as close as possible together, so that the length of the wheel base is comparatively short. Also, the wheels 9 and 31 are preferably some distance apart, so that the wheel base is comparatively wide, whereby the wheels will travel between the rows of corn, for example, (see Fig. 3), and so that the machine can be easily handled and steered to the right or the left, notwithstanding the fact that none of the wheels are arranged to turn for steering purposes, the steering being done entirely by controlling the two clutches 17 and 18, and by causing either axle 5 or 6 to rotate independently of the other, or to rotate faster than the other. When the steering wheel 26 is turned to the right, the clutch 17 will be closed, and the machine will turn to the right, and vice versa, when the steering wheel is turned to the left the clutch 18 will be closed and the machine will be steered to the left.

With a construction of this character, agricultural implements of different kinds can be attached to the rear of the body frame, and may actually be carried by the tractor itself, a capability and mode of operation for which the ordinary tractor is not especially adapted. For example, as shown (see Fig. 4), a pair of plows 33 and 34 can be connected to the rear portion of the body frame, in position to cut two furrows in the regular and well known manner. In such case the wheels 8 and 9, after the first furrow is cut, will then travel down in the furrow, while the wheel 31 will travel on the top surface of the ground. In other words, the wheels 8 and 9 operate somewhat like the front and rear furrow wheels of a wheeled plow, while the wheel 31 corresponds to what is ordinarily called the landside wheel of a wheeled plow. Any suitable means can be employed for raising and lowering the plows, and the connection between the plows and the body frame can be of any suitable, known or approved character. It will also be understood that cultivator gangs or other agricultural implements can be connected to the rear of the body frame in any suitable or desired manner.

It will be seen that the width of the wheel base is greater than the length thereof, inasmuch as the distance from the wheel 9 to the wheel 31 is greater than the distance between the axles 6 and 7, which helps to render the steering and controlling of the vehicle very easy and convenient. When the steering wheel is pulled backward the traction at opposite sides of the vehicle is balanced, and the machine travels straight ahead; when the steering wheel is turned to the right or to the left, so that the wheel at one side rotates while the wheel at the other side stands still, or so that the two wheels rotate at different speeds, the traction at opposite sides of the vehicle is then unbalanced, and with the comparatively wide but short wheel base, the vehicle is thereby easily turned to the right or the left. At the same time, the wheel base is of such length that the tractor is not unstable at any time, and the weight of the engine will counteract the weight of the agricultural implement when the latter is raised from the ground. An ordinary hand lever arrangement can be employed for raising and lowering the agricultural implement, in a manner that will be readily understood.

A seat 35 is attached to the rear end of the body frame in any suitable manner, directly in rear of the steering wheel, so that the driver or operator may control the tractor at will.

As shown in Fig. 4, the three-wheeled arrangement has certain advantages, the two wheels at one side traveling in the furrow, while the wheel 31 travels on the top surface of the ground at the land side of the machine. In other words, the wheels 8 and 9 are furrow wheels, while the wheel 31 is what is ordinarily known as a land-side wheel. The plow 34 throws the soil over into the furrow in which the wheels 8 and 9 travel, behind the wheel 9, while the plow 3 throws the soil over into the furrow cut by the plow 34, in a manner that will be readily understood, and with this construction, when the tractor is viewed from the furrow side, it appears to have a relatively long wheel base, this wheel base being determined by the distance between the axes of the wheels 8 and 9; whereas, on the other hand, when the tractor is viewed from the landside, it appears to have a wheel base of practically minimum length, inasmuch as the one wheel 31 makes contact with the ground for not more than a distance of two or three inches, ordinarily, depending upon the softness of the ground; and, in this sense, the tractor has a relatively long wheel base at one side and a relatively short wheel base at the other side. The distance from side to side, or the width, so to speak, of the entire wheel base of the tractor, sometimes called the tread, is greater than the maximum length of the wheel base, as previously explained, to make the machine steer more easily. While the wheels 8 and 9 are shown directly in line, longitudinally of the machine, it will be understood that the front wheel 8 can be arranged in any suitable or desired manner, ahead of one of the rear wheels, and that it is preferably disposed at one side of the longitudinal center line of the vehicle, so that the machine has two wheels at one side and a single wheel at the other side thereof. Of course, though, any suitable number of wheels can be employed at either side, and any suitable traction means can be employed to provide a relatively long wheel base at one side and a relatively short wheel base at the other side, with all of said traction means fixed in position to always travel straight ahead; and, with any such arrangement, the power for propelling the vehicle is preferably communicated to all of the wheels, or to the entire traction means of the vehicle. With the three - wheel construction shown and described, the vehicle has a three-point suspension, so to speak, or a three-point contact with the ground, and in this way all three wheels will always rest on the ground, even while traveling over uneven surfaces, the wheel base being triangular with power applied to each of the three points thereof.

What I claim as my invention is:—

1. A tractor comprising a rigid vehicle frame, two oppositely disposed rear wheels mounted on said frame, a single front wheel disposed ahead of one of said rear wheels, so that the vehicle has a long wheel base at one side and a short wheel base at the other side, and with the axis of rotation of each wheel held at a fixed angle to the frame, a motor having a driving connection, gearing having clutch mechanism to connect said driving connection with the two rear wheels, and steering gear devices comprising means for controlling the clutch mechanism to drive the two rear wheels in unison, or for driving the wheel at either side independently of the wheel at the other side, thereby to steer the tractor to the right or the left.

2. A structure as specified in claim 1, said front wheel having a driving connection therefrom to the wheel in rear thereof, so that all three wheels are driven in unison when the clutch mechanism is closed at both sides thereof.

3. A structure as specified in claim 1, said steering gear devices comprising a pair of bell cranks, a steering wheel, and means including a pair of crossed rods to connect said bell cranks with the steering wheel so that the steering wheel is turned to the right to steer the tractor to the right, and to the left to turn the tractor to the left.

4. A structure as specified in claim 1, said steering gear devices comprising a steering column pivoted to tilt backward and forward at the upper end thereof, a steering wheel on the upper end of said column, and connections extending from said steering column and wheel to said clutch mechanism, adapted by rotation of the steering wheel to the right or the left to control the clutch mechanism to steer the tractor to the right or the left, and adapted by tilting the steering wheel backward to control the clutch mechanism to drive the machine straight ahead, a casing for said mechanism, and means in the rear end of said casing to support the pivot of said steering column.

5. In a tractor, a pair of oppositely disposed traction members, a power plant having a driving connection, means including clutch mechanism to connect the driving connection with said traction members, a casing for said mechanism, and steering gear devices comprising a sleeve mounted to tilt about a transverse axis on the rear end of said casing, a steering column journaled in said sleeve to control the clutch mechanism to drive the tractor straight ahead, and adapted by rotation of the steering column to the right or the left to steer the tractor in either direction.

6. A structure is specified in claim 5, said steering column having one or more rigid foot pieces at the lower end thereof, below said axis thereby to assist the operator in tilting the steering column about its transverse axis, a seat disposed in position to permit the driver to place a foot on each foot piece, and spring means to hold the steering column in normal position and to yieldingly oppose the tilting thereof about said transverse axis.

7. A tractor comprising front and rear wheels disposed in fixed relation to each other, with only a single wheel in front, so that all of the wheels of the vehicle are always in position to travel straight ahead, forming a long wheel-base at one side and a short wheel-base at the other side, driving mechanism, and steering gear devices to control said mechanism to unbalance the traction at opposite sides of the vehicle to steer the tractor to the right or the left by supplying all the driving power to either the long or the short wheel-base.

8. A structure as specified in claim 7, the width of the wheel base being greater than the length thereof.

9. A structure as specified in claim 7, all of the wheels of the tractor being connected to rotate in unison, so that every wheel contributes to the propulsion of the vehicle.

10. A tractor comprising front and rear wheels arranged in fixed relation to each other, so that each wheel always travels straight ahead, steering gear devices, and clutch mechanism for controlling the traction at opposite sides to steer the vehicle to the right or the left, the relative arrangement of said wheels being such that the wheel base is substantially wider than it is long, thereby to facilitate the steering action.

11. A structure as specified in claim 10, there being two wheels arranged one in line with the other at one side of the tractor, and only a single wheel at the other side.

12. A tractor comprising a rigid vehicle frame, two oppositely disposed rear wheels mounted on said frame, a single front wheel disposed in line with one of said rear wheels, so that the vehicle is three-wheeled, with two wheels at one side and one wheel at the other side, a motor having a driving connection, gearing having clutch mechanism to connect said driving connection with the two rear wheels, and steering gear devices for controlling the clutch mechanism to drive the two rear wheels in unison, or for driving the wheel at either side independently of or faster than the wheel at the other side, thereby to steer the tractor to the right or the left, said front wheel having a driving connection therefrom to the wheel in rear thereof, so that all three wheels are driven in unison when the clutch mechanism is closed at both sides thereof.

13. A tractor comprising front and rear wheels disposed in fixed relation to each other, so that all of the wheels of the vehicle are always in position to travel straight ahead, driving mechanism, and steering gear devices to control said mechanism to unbalance the traction at opposite sides of the vehicle to steer the tractor to the right or the left, the width of the wheel base being greater than the length thereof, and the wheel base being longer at one side than at the other.

14. A tractor comprising a rigid vehicle frame, two oppositely disposed rear wheels mounted on said frame, a single front wheel disposed at one side of the longitudinal center line of the tractor, so that the vehicle is three-wheeled, with two wheels at one side of said line and one wheel at the other side of said line, and with the axis of rotation of the front wheel held at a fixed angle to the frame, a motor having a driving connection, gearing having clutch mechanism to connect said driving connection with the two rear wheels, and steering gear devices for controlling the clutch mechanism to drive the two rear wheels in unison, or for driving the wheel at either side independently of or faster than the wheel at the other side, thereby to steer the tractor to the right or the left.

15. A tractor comprising a rigid vehicle frame, two oppositely disposed rear wheels mounted on said frame, a single front wheel disposed in line with one of said rear wheels, so that the vehicle is three-wheeled, with two wheels at one side and one wheel at the other side, a motor having a driving connection, gearing having clutch mechanism to connect said driving connection with the two rear wheels, and steering gear devices for controlling the clutch mechanism to drive the two rear wheels in unison, or for driving the wheel at either side independently of or faster than the wheel at the other side, thereby to steer the tractor to the right or the left, said front wheel having a driving connection therefrom to the wheel in rear thereof, so that all three wheels are driven in unison when the clutch mechanism is closed at both sides thereof.

ALVARO S. KROTZ.